Patented July 28, 1942

2,291,009

UNITED STATES PATENT OFFICE 2,291,009

PRODUCTION OF DIASTATIC MATERIAL

Lee A. Underkofler, Ames, Iowa, assignor to The Chemical Foundation, Incorporated, a corporation of Delaware No Drawing. Application July 27, 1938,
Serial No. 221,633

3 Claims. (Cl. 195—73)

This invention relates to the production of alcohol, more particularly to the production of improved types of enzymatic material, capable of converting starches to fermentable sugars.

As is known, the production of ethyl alcohol from starchy material involves two essential operations; first, the conversion of the starch to fermentable sugars and, second, the fermentation of these fermentable sugars, by yeast, to ethyl alcohol and carbon dioxide. The first or saccharification step is essentially a hydrolytic action. To secure the best yields of alcohol, the starchy materials should be substantially quantitatively converted to maltose and dextrose. In actual practice, however, using the best conversion agents, yields far short of theoretical have been obtained.

In the past the saccharification treatment has been largely effected by utilizing malt. The malt generally employed in the industry is prepared from barley and, in the germinated form, contains considerable amounts of diastase or amylase. Amylase is not a single simple enzyme but is an enzymatic complex. The amylases obtained from different sources differ considerably as to their action on starch. In general, diastase possesses an amyloclastic or starch liquefying action which converts the starch to dextrins and a saccharogenic or sugar forming action which changes the dextrins to maltose.

In the usual method of producing ethyl alcohol, substantially 10% of barley malt, based on the weight of the grain employed, is used. The barley malt itself is one of the most expensive elements entering the process. In the ordinary practice of malting, one bushel of barley, or 48 pounds, yields only about 34 pounds of malt and this only after a long procedure which must be carefully conducted and which involves the investment of considerable sums in plant equipment. Under ordinary mashing conditions, as conducted in the industry, the amount of alcohol produced from a starch malted with barley is equal to only about 85% of that theoretically obtainable.

The art has long recognized this factor of high cost of the malting step and many attempts have been made to utilize other saccharification methods. Thus, it has been proposed to produce ethyl alcohol by saccharifying the starch with a mineral acid and then proceeding with the fermentation of the resulting product. Again, other germinated grains, such as corn and rye, and other vegetable materials, such as soy bean, have been suggested as saccharifying agents. These, as a general rule, present the same disadvantage as barley malt, more particularly, a low conversion power.

In addition to the germinated grains, many microorganisms also produce diastase. Of these, certain species of bacteria and molds are quite effective in producing the enzyme. In the past, suggestions have been made for utilizing such microorganisms for the commercial production of alcohol. Thus, it has been suggested to directly grow molds of the Mucor and Rhizopus groups in a mash in order to convert the starch before yeasting. While the molds are effective to some degree, they present the disadvantages that they are quite susceptible to contamination and require a prolonged time for the completion of the fermentation.

Other suggestions have included the utilization of Taka-diastase for the saccharifying agent. The suggestions involving the use of Taka-diastase in the past have related largely to the production of potable alcoholic beverages and the conditions of mold culture and malting have been developed for the purpose of producing alcoholic liquors of satisfactory flavor. But little effort has been expended in the past on the development of special mold preparations which are particularly effective for the production of industrial alcohol or power alcohol, that is to say, for the conversion of starchy materials into the maximum amount of fermentable sugars and under such circumstances as to insure the highest ultimate yield of ethyl alcohol.

A characteristic advantage inherent in the utilization of fungal enzymes over malted grains, in the preparation of alcohol, is the marked reduction in the cost of this material. The diastatic power of certain of these molds is very high and, as extensive experiments which have been conducted have proved, if they are properly cultivated and utilized in the saccharification step, it is possible to obtain a considerably greater yield of alcohol than is possible with barley malt. The hydrolytic action of these enzymatic preparations is quite specific and, as is well known to those skilled in the art, the conditions of growth and use are all-important factors in insuring efficient results. As is known, the diastatic power of an enzymic material may be determined and is sometimes expressed in degrees Lintner, according to the official method of the American Society of Brewing Chemists. However, the Lintner numbers obtained from different materials, such as malt, soy bean, mold cultures, and the like, have in reality little meaning with regard to the relative merits of these materials for saccharifying fermentation mashes. The usefulness of a diastatic material for such a conversion can accurately be determined only by running fermentation tests. For this reason, the findings listed herein are actually based upon fermentation of mashes.

The present invention then relates to the production of special mold diastatic material and to a method of utilization of such material in the commercial production of industrial alcohol.

In order to determine the suitability for such commercial use, a number of preliminary tests were conducted on eight species of bacteria and twenty-one species or strains of molds. As a result of such preliminary work, it was found that, measured by the strict criteria of commercial suitability, none of the bacteria were desirable. Of the molds which were tested, several strains of Rhizopus species and three strains belonging to the Aspergillus flavus-oryzae group were found to possess highest diastatic activity. These molds were further found to contain the amyloclastic and saccharogenic fractions in suitably high or balanced amounts to warrant their use for the purposes of the invention, namely, the production of industrial alcohol, such as power alcohol.

In order to determine the best medium for growth of the molds, a number of different media were thoroughly investigated, particularly corn mash, moistened distillers' grains and moistened wheat bran. It was ascertained, as a result of these tests, that moistened wheat bran gave by far the best and most uniform results; this medium was therefore chosen for the growth of the improved products contemplated herein.

A number of series of comparative tests showed that, in general, growth of the several Rhizopus species was less rapid and uniform than that of the Aspergillus cultures. In view of the desirable characteristics of high diastatic power, rapid growth and relatively low contamination susceptibility, the Aspergilli were then thoroughly investigated and the best method of producing these and utilizing them for a saccharification of starches was developed, as is more particularly described hereinafter.

For the purpose of determining the availability of this group, as well as to ascertain the optimum conditions of development and use, three cultures were selected, namely: #1, *Aspergillus oryzae*, secured from the American Type Culture Collection as #4814; #2, *Aspergillus flavus*, secured from Thom as #3538; and #3, *Aspergillus oryzae*, isolated from oat hulls. These three selected cultures were continuously cultivated on agar slants and on moistened bran. The cultures were plated for purity and no contamination was found. As a result of these tests it was found that all three cultures grew well on moistened bran. With cultures #1 and #2 only moderate sporulation occurred in 4 days and incubation for at least a week was found necessary for abundant sporulation. Culture #3 however produced a heavy crop of spores in 4 days. It was observed, likewise, that culture #3 caused less lumping during growth. It was determined that the best temperature for cultivation of the three cultures was within the range 25° C. to 35° C., 30° C. being about optimum.

In order to determine the possibility of culture development under non-contaminating conditions, a series of tests were conducted to establish whether the mold growth was active under conditions which would inhibit bacterial action. For this purpose, dilute acids of different concentrations were used instead of the water to moisten the medium, namely, the wheat bran. It was found that mold growth was quite satisfactory when hydrochloric acid up to 0.3 N was employed. Growth of culture #1 was a little more rapid when water was used, but sporulation was heavier in the acidified bran. There is no observable difference in the growth or sporulation of culture #3 in the aqueous and acidified mashes.

Having established the optimum conditions for development of these molds, preliminary experiments were conducted to determine their diastatic activity for the purpose of the invention, i. e., their ability to saccharify a grain mash under typical conditions of commercial practice. For this purpose, moldy bran resulting from the growth of the molds in flasks was employed. This was used to saccharify a corn mash in typical fermentation tests. Several series of fermentations were run, using different proportions of the moldy bran and employing different temperatures during the saccharification. It was found that the results were exceedingly variable and hence unsatisfactory. Further investigation indicated that this variation was due to the method of development, i. e., to the growth of the moldy bran in the flask and, more particularly, to the excessive matting and lumping which occurs during growth. It was ultimately ascertained that these molds could be cultured in large quantities and in a reproducible manner by continuously or periodically extenuating the medium, during growth of the mold, while insuring adequate oxygen respiration during the cultivation period. For this purpose the molds were developed on the moistened bran in a rotary vessel, rather than in a flask, and the mass was aerated with sterile humidified air. This type of treatment or production was found to insure a more rapid growth with less matting and lumping and, furthermore, the moldy bran was much more uniform and possessed a higher diastatic activity than that produced in the flasks.

Based upon these preliminary findings, a preferred method of utilizing the principles of the invention was developed. According to this method, the stock mold cultures are preferably grown on slants of sterile solid media in test tubes. For this purpose, both wort-agar medium and glycerol-yeast extract-agar medium are quite suitable.

When it is desired to cultivate the molds in flasks, this may be done, provided precautions are taken to avoid lumping and matting, and to insure adequate aeration. For this type of cultivation, wheat bran is thoroughly mixed with a quantity of distilled water and sterilized for an hour at 20 pounds per square inch steam pressure. It is particularly to be observed that for best results the mash should contain from 40% to 70% of water. In typical runs about 30 grams of bran were used in a 500 ml. Erlenmeyer flask and about 50 grams in a 1000 ml. flask. If larger quantities of bran are used, in vessels of this size, sporulation is seriously retarded, due to the insufficient access of air to the mass. The sterilized bran may then be given rather heavy inoculations from well sporulated slant cultures of the mold or from well sporulated cultures grown on the surface of a sterile beer wort. The flask should be well shaken every 4 to 8 hours to diminish matting and lumping of the contents as much as possible. As previously indicated, the optimum incubation temperature is substantially 30° C.

While it is possible to grow the cultures in large flasks, it is preferable, for commercial purposes, to effect the major growth by a different procedure, that is to say, in a rotating drum. In this method, a drum of suitable size is charged with a suitable amount of wheat bran which is well mixed with the requisite amount of water so as to give a final proportion of 40% to 70% of water. The drum and mash are then sterilized by heating for 2 or more hours at 20 pounds per square inch steam pressure. Thereafter, the mash is inoculated with from substantially 2% to substantially 5% of well sporulated bran mash culture grown in a flask. The drum is then set in rotation to insure thorough mixing of the contents.

As indicated hereinbefore, the drum is fitted with an air intake tube which is preferably connected in series to a flask of sulfuric acid, or other suitable sterilizing medium, and a flask of distilled water. The drum is also fitted with an air discharge tube. A slow stream of the air is passed through the drum during the germination period which, under normal conditions, is from about 12 to about 16 hours. During this germination period the drum should be rotated periodically but for not more than about 20 minutes each 2 hours. As the growth of the mold becomes active, the temperature of the mass tends to rise. After growth is well advanced, the rotation of the drum may be either continuous or intermittent, but the speed should not substantially exceed 1 R. P. M. Slow, continuous rotation is preferable during the development period and, as will be appreciated, during this period cooled humidified air should be admitted in regulated amounts so as to maintain the temperature below 35° C. and preferably at about 30° C. It will be observed that during the active growth period the bran assumes a white appearance, due to the mycelial development; sporulation of the mold changes the color to a yellow-green.

The described treatment is continued for a period of time sufficient to provide an abundant mold growth which, in normal circumstances, is from about 40 to 54 hours. At the end of this period the drum may be stopped and the moldy bran dried out at room temperatures, as by being screened and spread out thinly on suitable absorbent material. The dried material is then preferably reduced to coarse powder by grinding in a Burr mill. In this form, the improved product may be used to saccharify grain mashes for the production of alcohol in the same way as barley malt. Another method of drying the bran is to continue rotation in the drum, using dry, sterile air. This method is preferable as it prevents possible contamination, is quicker and saves space required for spreading.

It has been found that the moldy bran thus prepared is a particularly effective saccharifying agent for grain mashes. To establish the optimum conditions for preparation of the moldy bran and for saccharification of the mash, series of experiments were conducted in which the several important conditions were varied, including a comparison between the dried and the wet moldy bran. In these fermentations, yellow corn mash was employed as the amylaceous material. In the tests, 100 grams of corn meal and 1 gram of malt or of moldy bran was admitted to a 1000 ml. flask. To this flask was added 500 ml. of water which had been preliminarily heated to 80° C. and the mass was allowed to stand for about one-half hour. This premalting step was utilized to insure preliminary liquefaction of the raw starch and to prevent the mash from being too thick and lumpy on subsequent cooking. The mash was then cooked for 60 minutes at 20 pounds steam pressure, cooled to the conversion temperature (50–55° C.) and maintained at this temperature in a water bath. Weighed quantities of the diastatic material (equivalent to 10% of the weight of the corn) were then added to the mashes in the several flasks and the temperature maintained for 60 minutes, during which period the flasks were frequently agitated. After this mashing period, the malt was cooled to the incubating temperature (30° C.) and inoculated with yeast growing in beer wort, 50 cc. of the inoculum being used. After incubation for 3 days, the material was measured, a 300 ml. aliquot distilled into a volumetric flask and the alcohol content of the distillate was determined by measuring the specific gravity with a Chainomatic Westphal balance, the alcohol concentration being read from an appropriate table.

The ground yellow corn used in these tests was analyzed according to the method of the Association of Official Agricultural Chemists, the reducing substances formed being estimated by the Shaffer-Hartmann method and calculated as dextrose. The Shaffer-Hartmann reagents were standardized against a sample of pure dextrose. In the tables the yields are expressed as per cent. of the theoretical conversion of the carbohydrate in the corn to alcohol. The data given in the table represents the average values for duplicate fermentations and all yields are corrected for the amount of alcohol derived from the inoculum and diastatic material.

Moldy brans were prepared using each of the three selected cultures mentioned. It was found that most rapid development of the molds began about 12 to 16 hours after inoculation. Abundant sporulation of culture #3 was found to occur within this period of time, while cultures #1 and #2 did not sporulate so heavily. It is to be observed that, since the diastase is probably most abundant at the time of sporulation, it is desirable to remove the moldy bran from the drum and to spread it out for drying before extensive sporulation has taken place. It will be found that sporulation ensues during the drying period.

The efficacy of the novel material for the intended use will be more readily appreciated from an inspection of the following tables, in which are given the data of actual fermentation tests as outlined above. In Table I are given the results of typical fermentations with the three different cultures as compared to malt controls. The fermentations recorded in Table I were carried out in the manner outlined above, in which 10% of the mold culture, on the weight of the corn, was used.

TABLE I

Fermentation tests with several moldy brans

| No. | Mold culture | Drum run No. | Alcohol yield, percent of theory |
|---|---|---|---|
| 1 | Malt | Control | 80.0 |
| 2 | 1 | 5 | 78.0 |
| 3 | 1 | 9 | 83.5 |
| 4 | 1 | 10 | 87.6 |
| 5 | 1 | 11 | 90.0 |
| 6 | 1 | 13 | 97.4 |
| 7 | 1 | 18 | 92.9 |
| 8 | 1 | 19 | 93.9 |
| 9 | 3 | 5 | 92.4 |
| 10 | 3 | 16 | 91.6 |
| 11 | 3 | 19 | 91.3 |
| 12 | 2 | 8 | 68.7 |
| 13 | Malt | Control | 80.5 |

It will be observed from an inspection of Table I that the results show little difference in alcohol yields when moldy bran of culture #1 or culture #3 were used, but culture #1 apparently possessed some slight superiority. Culture #2 yielded a moldy bran preparation which appeared to be definitely inferior for saccharifying a fermentation mash. It is particularly to be observed that the alcohol yields from the moldy bran cultures, in practically every case, was considerably higher than that obtained from the malt control. The better fermentations, e. g., numbers 5 to 11, gave much greater alcohol yields than the malt controls, generally averaging about 12% higher.

In order to determine the optimum physical condition and amounts of the moldy bran, comparative tests were run showing the effect of high dispersion and variation in amounts of the mold culture.

TABLE II

Effect of grinding and of proportion of moldy bran, (culture No. 1, run 5) on alcohol yields from corn

| Moldy bran percent of corn (dry basis) | Alcohol yield, percent of theory | |
|---|---|---|
| | Unground | Ground |
| 2.62 | 69.7 | 70.0 |
| 5.24 | 73.4 | 75.0 |
| 7.85 | 76.8 | 77.1 |
| 10.47 | 76.4 | 78.0 |
| 11.75 | 75.2 | 76.1 |

From a study of Table II, it is quite apparent that the grinding of the dried moldy material increased the yield at every proportion. It would appear that the grinding process makes the enzyme more available for saccharification of the starch due to the higher degree of dispersion. It will also be observed from the table that the proportion of moldy bran required to give maximum alcohol yields is about 8% to 10% of the corn used.

Tests were also conducted to determine the influence of the conversion temperature and the proportion of moldy bran required to produce a maximum alcohol yield. The results of these tests are indicated in Tables III and IV.

TABLE III

Results of variation of proportion of moldy bran (culture No. 1, run 13) and of saccharification temperature on the alcohol yield

| Temperature of saccharification | Moldy bran, percent of corn (dry basis) | Alcohol yield percent of theory |
|---|---|---|
| 40-45° C | 4.88 | 81.2 |
| 40-45° C | 7.23 | 83.5 |
| 40-45° C | 9.67 | 88.1 |
| 45-50° C | 4.88 | 77.5 |
| 45-50° C | 7.23 | 84.8 |
| 45-50° C | 9.67 | 92.0 |
| 50-55° C | 4.88 | 80.2 |
| 50-55° C | 7.23 | 88.4 |
| 50-55° C | 9.67 | 97.4 |

TABLE IV

Results of variation of proportion of moldy bran (culture No. 3, run 16) and of saccharification temperature on alcohol yields

| Temperature of saccharification | Mold-bran percent of corn | Alcohol yield, percent of theory |
|---|---|---|
| 45° C | 10.56 | 93.9 |
| 60° C | 10.56 | 91.3 |
| 50-55° C | 10.56 | 91.6 |
| 50-55° C | 7.92 | 92.0 |
| 50-55° C | 5.36 | 85.5 |

From these tests it is apparent that, while there is some variation in optimum temperature as between the different specific molds, any temperature between 45° C. and 60° C. is suitable for the saccharification of corn mash by these moldy brans. It was also apparent that effecting saccharification with substantially 10% of the moldy bran and at a temperature of the order of 45° C. to 55° C. insures a most satisfactory yield of alcohol. For example, as shown in Table III, saccharifying a corn mash with 9.67% of a moldy bran produced from culture #1 and at a temperature of 45° C. to 50° C. insures the production of 92% of the theoretical amount of alcohol, whereas (see Table I) in substantially the same circumstances saccharification with an equivalent amount of malt produces only 80% of the theoretical amount of alcohol. Similarly, as will be observed in Table IV, saccharification of a corn mash with 10.5% of culture #3 and at a temperature between 50° C. and 55° C. insures the production of 91.6% of the theoretical amount of alcohol producible. This is considerably greater than that produced by the malt control which, as will be observed from an inspection of Table I, is but 80%.

These findings were further confirmed by conversion of starchy mashes on a larger scale than those indicated in the tables. A number of culture tank fermentations were carried out under the conditions described, using about 85 gallons of mash in each case. The mash was premalted at a temperature of 60° C. for 30 minutes, water was added to bring the volume up to 85 gallons, the mash was cooked for 60 minutes at 15 pounds per square inch steam pressure, was then cooled to 55° C. and mashed with about 10% of moldy bran. The saccharification was carried out at 50° C. to 55° C. for an hour. The mash was then cooled to 30° C. and inoculated with an active yeast culture in molasses medium. Immediately after inoculation, a sample of the mash was taken for determination of reducing sugars, total carbohydrate and acidity. The mash was vigorously agitated and aerated for 15 minutes out of each hour for the first 6 hours after inoculation. Twelve hours after inoculation the mash was sampled and analyzed for alcoholic content and acidity. Subsequent sampling and analysis was made each hour until optimum alcoholic concentration was reached. In Table V is given the results of a typical one of these culture tank fermentations.

TABLE V

| Wt. of corn, lbs. | Moldy bran | Moldy bran percent of corn (dry basis) | Total carbohydrate (dextrose) g./100 cc. | Residual carbohydrate (dextrose) g./100 cc. | Carbohydrate utilized percent | Alcohol yield g./100 cc. | Alcohol yield, and of theory | Final acidity ml. 0.1 N. per 10 ml. of beer |
|---|---|---|---|---|---|---|---|---|
| 100 | Culture #2, air dried, ground. | 9.9 | 7.96 | 0.80 | 90.0 | 3.66 | 90.1 | 5.9 |

It will be observed that the results recorded in Table V, obtained as a result of the novel method, are much better than those usually obtained when using malt.

It will be observed that fungal diastatic material of a high conversion power may be produced when adhering to the conditions outlined herein. It is known that the *Aspergillus oryzae* amylase is generally similar to malt amylases. However, this mold amylase is also generally recognized to possess a greater amyloclastic, but smaller saccharogenic, action than most malt preparations. While it is difficult to determine the specific modification of the enzymatic action which is effected by the described improved mode of cultivation, it is quite evident that it materially improves the saccharifying action as is attested by the marked increase in alcohol yields.

In commercial operations, the moldy bran preferably should be ground before use in saccharifying mashes and may be used in either wet or dry form. It has been found that air drying does not affect the diastatic activity, nor does storing in the dry condition. The improved product therefore satisfies all the requirements of commercial manufacture and use.

While preferred modifications of the invention have been described, it is to be understood that these are given for the purpose of explaining the underlying principles involved and not as limiting the invention to the particular procedures selected for illustrating these principles.

I claim:

1. A method of producing a diastatic material of high conversion power which comprises inoculating a wheat bran, containing from substantially 40% to substantially 70% of 0.3 N hydrochloric acid, with *Aspergillus oryzae*, in a closed container maintaining the mass at a temperature of between substantially 25° C. and substantially 35° C. while aerating the mass with sterile humidified air.

2. A method of producing a diastatic material of high conversion power which comprises inoculating a wheat bran, containing from substantially 40% to substantially 70% of 0.3 N hydrochloric acid, with *Aspergillus oryzae*, in a closed container maintaining the mass at a temperature of between substantially 25° C. and substantially 35° C. while aerating with sterile humidified air and periodically agitating the mass.

3. A method of producing diastatic material of high saccharification value which comprises inoculating a wheat bran, containing from substantially 40% to substantially 70% of 0.3 N hydrochloric acid, with from substantially 2% to substantially 5% of a culture of *Aspergillus oryzae*, in a closed container maintaining the mass at a temperature of between substantially 25° C. and 35° C., while aerating with sterile humidified air and periodically agitating the mass.

LEE A. UNDERKOFLER.